US 9,811,324 B2

United States Patent
Guo et al.

(10) Patent No.: US 9,811,324 B2
(45) Date of Patent: Nov. 7, 2017

(54) CODE CACHING SYSTEM

(71) Applicant: Google Inc., Mountain View, CA (US)

(72) Inventors: Yang Guo, Unterhaching (DE); Daniel Vogelheim, Unterhaching (DE); Jochen Mathias Eisinger, Munich (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/726,376

(22) Filed: May 29, 2015

(65) Prior Publication Data
US 2016/0350089 A1  Dec. 1, 2016

(51) Int. Cl.
*G06F 9/45* (2006.01)
*G06F 9/30* (2006.01)
*G06F 17/30* (2006.01)
*G06F 9/455* (2006.01)
*H04L 29/08* (2006.01)

(52) U.S. Cl.
CPC .......... *G06F 8/4441* (2013.01); *G06F 8/4434* (2013.01); *G06F 9/3017* (2013.01); *G06F 9/45529* (2013.01); *G06F 17/30902* (2013.01); *H04L 67/2842* (2013.01)

(58) Field of Classification Search
CPC ...... G06F 8/41–8/44; G06F 8/51; G06F 8/52; G06F 9/3017–9/30178; G06F 9/455–9/45529; G06F 17/30902; G06F 8/443–8/4443; H04L 29/08729; H04L 29/08801–29/08819; H04L 67/2842–67/2852
See application file for complete search history.

(56) References Cited

U.S. PATENT DOCUMENTS

| 5,530,964 | A | 6/1996 | Alpert et al. |
|---|---|---|---|
| 6,393,415 | B1 * | 5/2002 | Getchius et al. |
| 7,389,317 | B2 | 6/2008 | Guttag et al. |
| 7,640,153 | B2 * | 12/2009 | Bala ................... G06F 9/45516 703/20 |
| 7,761,857 | B1 * | 7/2010 | Bedichek et al. ............ 717/138 |
| 7,805,710 | B2 * | 9/2010 | North ............................ 717/136 |

(Continued)

OTHER PUBLICATIONS

Hölzle, U., et al., Optimizing Dynamically-Typed Object-Oriented Languages with Polymorphic Inline Caches, ECOOP '91 European Conference on Object-Oriented Programming [online], 1991 [retrieved Aug. 19, 2017], Retrieved from Internet: <URL: https://link.springer.com/content/pdf/10.1007%2FBFb0057013.pdf>, pp. 21-38.*

(Continued)

*Primary Examiner* — Todd Aguilera
(74) *Attorney, Agent, or Firm* — McDermott Will & Emery LLP

(57) ABSTRACT

Systems and methods for code caching are provided. A first indication of primary source code awaiting execution is received. A resource cache is checked for cached data corresponding to the primary source code. Upon a cache miss in the resource cache, a first executable code compiled from the primary source code is obtained. A secondary source code referenced in the primary source code is selected. A second executable code compiled from the selected secondary source code is obtained. The first executable code and the second executable code are serialized into serialized code. The serialized code is stored as cached data in the resource cache.

22 Claims, 6 Drawing Sheets

(56) References Cited

U.S. PATENT DOCUMENTS

| | | | |
|---|---|---|---|
| 7,818,724 B2 * | 10/2010 | Suzuoki | 717/136 |
| 7,890,961 B2 * | 2/2011 | Whittle et al. | 719/320 |
| 8,095,507 B2 | 1/2012 | Wu et al. | |
| 8,245,202 B2 * | 8/2012 | Miura | 717/138 |
| 8,286,152 B2 * | 10/2012 | Grcevski et al. | 717/148 |
| 8,392,881 B1 | 3/2013 | Lund et al. | |
| 8,479,176 B2 * | 7/2013 | Ottoni et al. | 717/136 |
| 8,867,337 B2 * | 10/2014 | Duftler | G06F 17/30902 370/219 |
| 9,069,876 B2 * | 6/2015 | Uola et al. | |
| 2002/0184618 A1 * | 12/2002 | Bala | G06F 9/45516 717/148 |
| 2005/0015758 A1 * | 1/2005 | North | 717/138 |
| 2005/0028155 A1 * | 2/2005 | Jung | 718/1 |
| 2005/0050547 A1 * | 3/2005 | Whittle et al. | 719/310 |
| 2006/0179278 A1 * | 8/2006 | Suzuoki | 712/209 |
| 2006/0206874 A1 | 9/2006 | Klein | |
| 2008/0263527 A1 * | 10/2008 | Miura | 717/138 |
| 2009/0055821 A1 * | 2/2009 | Grcevski et al. | 718/1 |
| 2009/0307430 A1 | 12/2009 | Bruening et al. | |
| 2011/0173597 A1 | 7/2011 | Cascaval et al. | |
| 2011/0179347 A1 | 7/2011 | Proctor et al. | |
| 2011/0307876 A1 * | 12/2011 | Ottoni et al. | 717/153 |
| 2011/0321010 A1 | 12/2011 | Wang | |
| 2012/0185822 A1 | 7/2012 | Lee et al. | |
| 2012/0278558 A1 * | 11/2012 | Duftler | G06F 17/30902 711/133 |
| 2012/0317363 A1 * | 12/2012 | Uola et al. | 711/130 |
| 2013/0159978 A1 | 6/2013 | Jazdzewski et al. | |
| 2013/0212567 A1 * | 8/2013 | Fisher et al. | 717/140 |
| 2014/0095778 A1 * | 4/2014 | Chung et al. | 711/104 |
| 2014/0095802 A1 * | 4/2014 | Lee | G06F 12/128 711/136 |

OTHER PUBLICATIONS

Sanghoon Jeon et al., "Reuse of JIT Compiled Code in JavaScript Engine," SAC'12, Mar. 25-29, 2012, 3 pages, Riva del Garda, Italy.

Urs Holzle et al., "Optimizing Dynamically-Typed Object-Oriented Languages With Polymorphic Inline Caches," ECOOP '91 Proceedings, Springer Verlag Lecture Notes in Computer Science 512, Jul. 1991, 18 pages, Geneva, Switzerland.

International Search Report and Written Opinion dated Oct. 19, 2016, which issued in International Application No. PCT/US2016/024791.

Hong et al., "Java Client Ahead-of-Time Compiler for Embedded Systems," Proceedings of the 2007 ACM SIGPLAN/SIGBED Conference on Languages, Compilers and Tools for Embedded Systems, Jun. 2007, pp. 63-72.

* cited by examiner

CODE CACHING SYSTEM

BACKGROUND

The subject technology relates to caching executable code and, in particular, relates to selecting source code for compiling, serializing and caching the executable code and deserializing the cached executable code prior to execution.

Virtual Machines (VMs) are used for execution of software code upon on-demand compilation, also referred to as Just in Time (JIT) compilation, in which compilation of code is performed immediately prior to execution of the code or part of the code is compiled on-demand (e.g., lazily). When the code is embedded in a resource, for example a resource within a web page, the speed with which the resource can be rendered within an application (e.g., a browser) running on a client device depends upon the speed of execution of the embedded code. A user of the client device may access the same resource repeatedly within the same work session, for example a web browser session, or across multiple independent work sessions. However, if the code has to be compiled every time a user accesses the resource, a noticeably long time may be needed for each compilation.

SUMMARY

In various aspects, the disclosed subject matter can be embodied in a system. The system includes one or more processors. The system also includes a memory. The memory includes instructions which, when executed, cause the one or more processors to implement a method. The instructions include code for receiving a first indication of primary source code awaiting execution. The instructions include code for checking a resource cache for cached data corresponding to the primary source code in response to receiving the first indication. The instructions include code for, upon a cache miss in the resource cache, obtaining first executable code compiled from the primary source code. The instructions include code for selecting secondary source code referenced in the primary source code. The instructions include code for obtaining second executable code compiled from the selected secondary source code. The instructions include code for serializing the first executable code and the second executable code into serialized code. The instructions include code for storing the serialized code as cached data in the resource cache These and other implementations can include one or more of the following features. The instructions may include code for obtaining execution results from execution of the first executable code in a first execution context, wherein the secondary source code is selected based on the execution results. The secondary source code may be selected based on one or more of a size of the secondary source code, a size of the second executable code, a prediction that the secondary source code is referenced in the primary source code, a number of times the secondary source code is referenced in the primary source code, a frequency of the secondary source code referenced in the primary source code, or a compile time of the secondary source code. The instructions may include code for receiving a second indication of the primary source code awaiting execution in a second execution context, wherein the second indication is received subsequent to the first indication. The instructions may include code for checking the resource cache for cached data corresponding to the primary source code and to the selected secondary source code, in response to receiving the second indication. The instructions may include code for, upon a cache hit in the resource cache, retrieving the cached data comprising the serialized code from the resource cache. The instructions may include code for deserializing the retrieved serialized code, into third executable code. The instructions may include code for providing the third executable code for execution in the second execution context.

These and other implementations can include one or more of the following features. The first execution context and the second execution context can be two different virtual machine environments for code execution. The primary source code can be a script in a web page and the first execution context and the second execution context can be web browser sessions within which the script is executed. The primary source code can be a top-level script of a web page. The first executable code may include a set of references including fixed memory addresses specific to the first execution context, embedded in the first executable code. The instructions including code for serializing the first executable code may include code for replacing the embedded memory addresses with abstract addresses non-specific to the first execution context.

In one innovative aspect, the disclosed subject matter can be embodied in a system. The system includes one or more processors. The system also includes a memory. The memory includes instructions which, when executed, cause the one or more processors to implement a method. The instructions include code for receiving a first indication of primary source code awaiting execution. The instructions include code for checking a resource cache for cached data corresponding to the primary source code in response to receiving the first indication. The instructions include code for, upon a cache miss in the resource cache, obtaining first executable code compiled from the primary source code. The instructions include code for serializing the first executable code into serialized code based on one or more of a size of the primary source code, a number of times the primary source code is executed in a predefined period of time, or a compile time of the primary source code. The instructions include code for storing the serialized code as cached data in the resource cache.

These and other implementations can include one or more of the following features. The instructions may include code for selecting secondary source code referenced in the primary source code, at least based on a size of the secondary source code, a number of times the secondary source code is referenced in the primary source code, a compile time of the secondary source code, or a combination thereof. The instructions may include code for obtaining second executable code compiled from the secondary source code. The instructions may include code for serializing the second executable code into the serialized code. The instructions may include code for obtaining execution results from execution of the first executable code in a first execution context, wherein the secondary source code is selected based on the execution results. The instructions may include code for receiving a second indication of the primary source code awaiting execution in a second execution context, wherein the second indication is received subsequent to the first indication. The instructions may include code for checking the resource cache for cached data corresponding to the primary source code and to the selected secondary source code, in response to receiving the second indication. The instructions may include code for, upon a cache hit in the resource cache, retrieving the cached data comprising the serialized code from the resource cache. The instructions may include code for deserializing the retrieved serialized code, into third executable code. The instructions may include code for providing the third executable code for execution in the second execution context.

These and other implementations can include one or more of the following features. The first execution context and the second execution context may be two different virtual machine environments for code execution. The first executable code may include a set of references including memory addresses embedded in the first executable code, and the instructions including code for serializing the first executable code may include code for replacing the embedded memory addresses with abstract addresses.

In one innovative aspect, the disclosed subject matter can be embodied in a computer-readable medium that includes instructions that can be executed by a computer. The instructions include code for causing the computer to receive a first indication of primary source code awaiting execution. The instructions include code for causing the computer to check a resource cache for cached data corresponding to the primary source code in response to receiving the first indication. The instructions include code for, upon a cache miss in the resource cache, causing the computer to obtain first executable code compiled from the primary source code. The instructions include code for causing the computer to obtain execution results from execution of the first executable code in a first execution context. The instructions include code for causing the computer to select secondary source code referenced in the primary source code, based on the execution results. The instructions include code for causing the computer to obtain second executable code compiled from the selected secondary source code. The instructions include code for causing the computer to serialize the first executable code and the second executable code into serialized code. The instructions include code for causing the computer to store the serialized code as cached data in the resource cache.

These and other implementations can include one or more of the following features. The first executable code may include a set of references including memory addresses embedded in the first executable code, and the instructions causing the computer to serialize the first executable code may include instructions to cause the computer to replace the embedded memory addresses with abstract addresses. The execution results may indicate a number of times the secondary source code referenced in the primary source code is executed at the execution of the primary source code. The instructions may include code for causing the computer to receive a second indication of the primary source code awaiting execution in a second execution context, wherein the second indication is received subsequent to the first indication. The instructions may include code for causing the computer to check the resource cache for cached data corresponding to the primary source code and to the selected secondary source code, in response to receiving the second indication. The instructions may include code for, upon a cache hit in the resource cache, causing the computer to retrieve the cached data comprising the serialized code from the resource cache. The instructions may include code for causing the computer to deserialize the retrieved serialized code, into third executable code. The instructions may include code for causing the computer to provide the third executable code for execution in the second execution context. The first execution context and the second execution context can be two different virtual machine environments for code execution. The instructions may include code for causing the computer to obtain a first execution profile associated with the first executable code and a second execution profile associated with the second executable code. The instructions may also include code for causing the computer to serialize the first execution profile and the second execution profile. The instructions may also include code for causing the computer to store the serialized first execution profile and second execution profile in the resource cache, wherein deserializing the retrieved serialized code includes deserializing the first execution profile and the second execution profile.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Glossary

Figure 1:
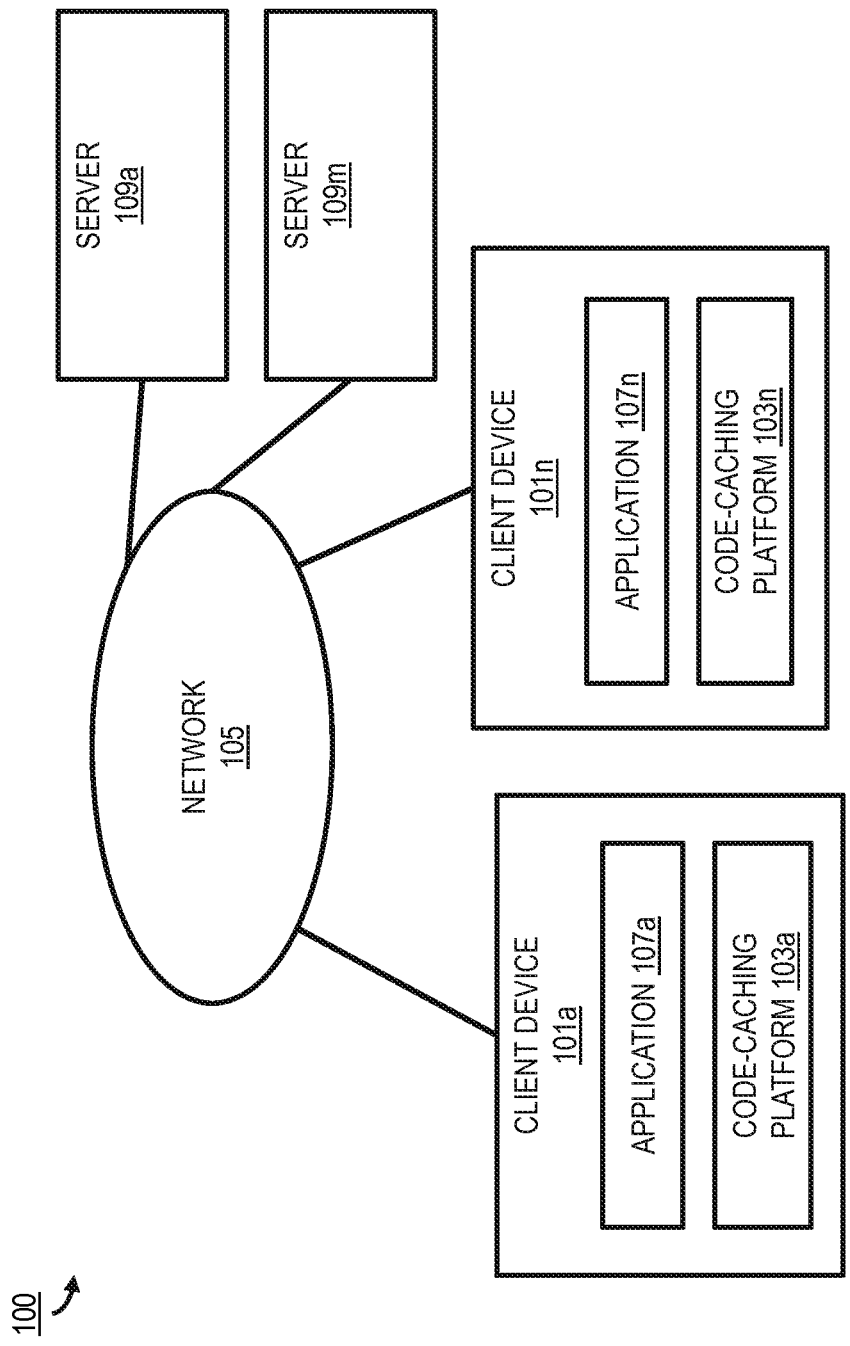
FIG. 1 illustrates an example network environment in which code caching may be processed.

Abstracting (Abstraction): Abstraction is a process of replacing references in an object (e.g., code) to memory addresses and other objects specific to an execution context with instructions for recreating the references (e.g., relocation data) such that the object can be recreated in a new execution context.

Serializing (Serialization): Serialization is a process of generating a representation of an object (e.g., compiled executable code) as sequential data that can be transported and includes the object's data as well as information about the object such as the object's type or the types of data stored in the object.

Deserializing (Deserialization): Deserialization is a process of extracting and generating an object (e.g., compiled executable code) from the sequential data of a serialized object.

Source code: Source code is a collection of computer instructions specifying actions to be performed by a computer and written using a human-readable computer language.

Executable Code: Executable code is a set of machine language instructions executable by a computer and produced by parsing and compiling source code.

Execution Context (Execution Environment): Execution context is a set of operational parameters defining a computer system or a software emulation of a computer system (e.g., a virtual machine) within which executable code is executed.

Relocation data: Relocation data are instructions or information used to restore abstracted code references to memory locations or objects in a current execution context.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Load time of resources is an important part of the user experience when trying to access a resource via a computing device. The resource may be an application, file or document loaded from a local memory within the computing device or a network resource such as, for example, a file or a document within a webpage loaded from a network. However, dynamic scripts such as, for example, JAVASCRIPT® code embedded within a resource need to be compiled prior to being executed, and this can slow down the process of loading the resource. Therefore, it is desirable to improve efficiency of rendering resources on computing devices by caching compiled code into a resource cache and reusing the cached code for future accesses to the resource during subsequent sessions.

Source code may be transformed by a compiler program into low-level machine code that is executable by the computer. The machine code might then be stored for execution. Alternatively, an interpreter can be used to analyze and perform the outcomes of the source code program directly on the fly. Parsing and compiling source code (e.g., JAVASCRIPT® code) embedded in an application or a document such as, for example, a web page to produce executable code, is on the critical path for loading the resource. When executed by a computer processor, executable code causes the processor to perform tasks according to the instructions. Machine language is the set of native instructions the computer carries out in hardware. In order to speed up the loading process, the compiled code can be serialized and cached, for example in a binary format. Once the executable code is cached, on subsequent executions of the script, the source code no longer has to be re-parsed and re-compiled, and the executable code can be deserialized from the cache and executed.

During serialization of compiled code, the state of the code can be converted into a form that can be transported from an execution environment to other execution environments. Serialization process translates data structures or object states into a format that can be reconstructed in the same or another context (e.g., execution environment) based on the information embedded in the serialized object. Serialization may provide executable code, from the compiled code, for various components of the code and for objects the code references to such as, for example, data structures representing constants, string literals, object literals, function objects including relocation data necessary for on-demand compilation, shared pieces of code, references to the execution environment (e.g., VM), etc.

FIG. 1 illustrates an example network environment 100 in which code caching may be processed. Network environment 100 includes client devices 101a and 101n and servers 109a and 109m. Although two client devices 101a and 101n, and two servers 109a and 109m are shown in FIG. 1, the subject technology is not limited to such and can apply to more than two client devices and servers or just one client device and/or server. Client devices 101a and 101n and servers 109a and 109m can communicate with each other through network 105. Server 109a or 109m can include computing devices similar to client devices and computer-readable storage devices (not shown).

Each of client devices 101a and 101n can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Client devices 101a and 101n and servers 109a and 109m may be provided access to or receive application software executed or stored on any of the other client devices 101a and 101n or servers 109a and 109m.

Servers 109a and 109m may be any system or device having a processor, a memory, and communications capability for providing content to client devices 101a and 101n. In some example aspects, server 109a or 109m can be a single computing device, for example, a computer server. In other implementations, server 109a or 109m can represent more than one computing device working together to perform the actions of a server computer (e.g., cloud computing). Further, server 109a or 109m can represent various forms of servers including, but not limited to a web server, an application server, a proxy server, a network server, or a server farm.

In some aspects, client devices 101a and 101n may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans networks, for example, network 105. Network 105 can be a large computer network, for example, a local area network (LAN), wide area network (WAN), the Internet, a cellular network, or a combination thereof connecting any number of mobile clients, fixed clients, and servers. Further, network 105 can include, but is not limited to, any of the following network topologies, including a bus network, a star network, a ring network, a mesh network, a star-bus network, tree or hierarchical network, and the like. In some aspects, communication between each client (e.g., client devices 101a and 101n) and server 109a or 109m can occur via a virtual private network (VPN), Secure Shell (SSH) tunnel, or other secure network connection. In some aspects, network 105 may further include a corporate network (e.g., intranet) and wireless access points.

In example aspects, any of client devices 101a or 101n can communicate with each other and with servers 109a or 109 via network 105 using a network protocol such as, for example, the Hypertext Transfer Protocol (HTTP) protocol. Client device 101a or 101n can receive user input for an application 107a or 107n (e.g., a web browser) within a user interface of client device 101a or 101n. The user input can specify which content to load. For example, a user input can be a Uniform Resource Locator (URL) address associated with a website specifying what web content to be loaded from server 109a or 109m. The user may also enter input to specify what part of a web page the user wishes to see on a User Interface (UI) of client device 101a or 101n (now shown in FIG. 1). In such example aspects, each of client devices 101a or 101n can include a code-caching platform 103a or 103n, which can, check a cache for cached executable code based on a request from user, and provide the cached executable code for execution on client device 101a or 101n. The code-caching platform 103 or 103n can also select parts of the executable code for caching.

Figure 2:
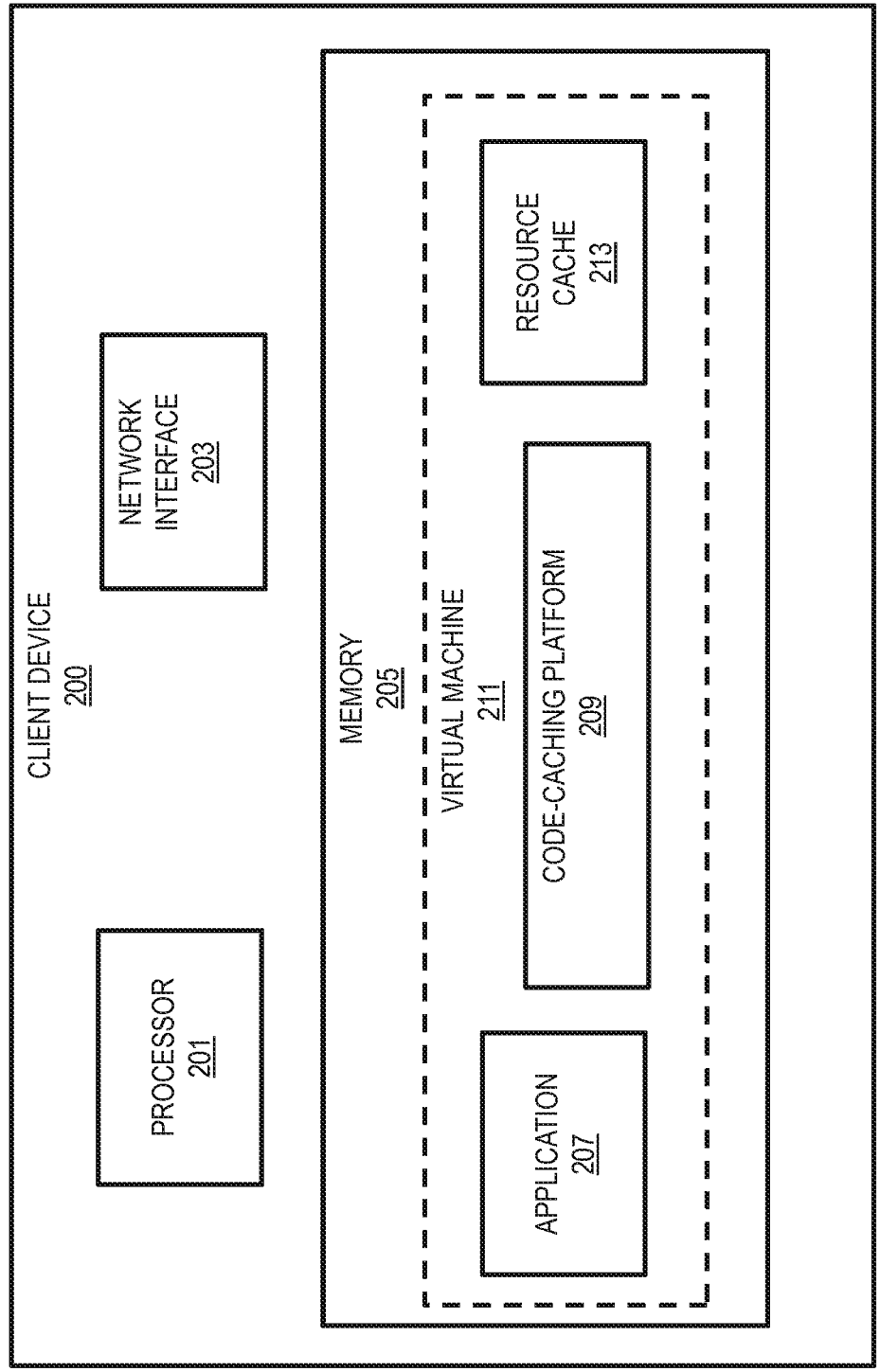
FIG. 2 illustrates a client device to which code caching may be provided.

FIG. 2 illustrates a client device for which code caching may be provided. The client device 200 is similar to client devices 101a and 101n of FIG. 1. As shown, the client device 200 includes a processor 201, a network interface 203, and a memory 205. The processor 201 is configured to execute computer instructions that are stored in a computer-readable medium, for example, the memory 205. The processor 201 may be a central processing unit (CPU). The network interface 203 is configured to allow the client device 201 to transmit and receive data in network 105, for example, the Internet, an intranet, a local area network or a cellular network. The network interface 203 may include network interface cards (NICs).

The memory 205 stores data and instructions. As shown, the memory 205 includes an application 207, similar to applications 107a and 107n of FIG. 1, and a code-caching platform 209, similar to the code-caching platform 103a and 103n of FIG. 1. The application 207 and the code-caching platform 209 may function within an execution environment such as the virtual machine 211.

Application 207 can be a software application executed on the client device 200 by processor 201. For example, the application 207 may be a web browser providing, to a user of the client device 200, access to services provided by servers 109a or 109m via network 105. The servers 109a and 109m may provide services to client device 200 in the form of websites and a web page provided by server 109a or 109m may include multiple source code or scripts (e.g., JAVASCRIPT®) that are compiled and executed upon being loaded at the client device 200.

The code-caching platform 209 may be configured to provide code-caching services to application 207, where application 207 renders services provided by servers 109a and 109m to the client device 200. In some aspects, the code-caching platform 209 receives an indication of source code embedded in an application 207 awaiting execution on client device 200. The indication of the source code may be a link referring to a location of the source code embedded in application 207 in memory 205. The indication can also be an identifier associated with the source code, or the full content of the source code. In response to receiving the indication, the code-caching platform 209 can check a resource cache 213 within memory 205 for cached executable code corresponding to the source code. The resource cache 213 may be stored in persistent/non-volatile memory.

For example, the source code, or parts of the source code (e.g., a sub-code, a function, etc.) may have been previously compiled and cached in the resource cache 213. A sub-code, also referred to as a secondary source code, can be a function referenced (e.g., called) within the source code. The secondary source code may be referenced within the source code based on various conditions such as, for example, a user input, an output from another secondary source code, etc. In addition, data related to the source code such as, for example, type information may have been cached. The cached data can be used by the compiler to produce an executable code more efficiently. For example, the code-caching platform 209 may obtain executable code compiled from the source code by sending the source code to a compiler within the client device 200 (not shown in FIG. 2) to be compiled into the executable code, and provide the executable code for execution on client device 200. If the cached executable code corresponding to the source code or a secondary source code referenced in the source code is not found in the resource cache 213, the code-caching platform 209 may select secondary source code referenced in the source code to be compiled. The code-caching platform 209 may cache executable code corresponding to the source code and/or executable code corresponding to the secondary source code. However, if cached executable code corresponding to the source code is found in the resource cache 213, the cached executable code can be retrieved from the source cache and executed without a need for compilation of the source code.

The executable code may include a set of references. The references included in the executable code can be memory addresses, for example, embedded in the executable code corresponding to the execution environment (e.g., a virtual machine 211) in which the executable code is being executed. The embedded addresses may not be portable from one execution context to another. However, the relocation data generated by abstracting the embedded addresses can be portable across execution contexts. The relocation data can be used to implement abstraction of embedded addresses in the executable code, for example, by restoring the non-portable addresses after porting. Upon obtaining executable code for the source code and the selected secondary source code, the code-caching platform 209 serializes the executable codes. The serialization includes abstracting the set of references in the executable code from an execution context (e.g., the virtual machine 211). Execution context provides an operating environment within a computer system with access to processing power and memory for executing the executable code. The code-caching platform 209 generates relocation data associated with the executable code to reflect the abstractions such that further conversion of the abstracted references can be performed based on the generated relocation data.

The code-caching platform 209 can store the serialized code for the source code and the selected secondary source code referenced in the source code as cached data in the resource cache 213 within the memory 205. Conventional cache management strategies may be used for managing the resource cache. In addition, cache tags can be used for identifying cached data location in the resource cache. The code-caching platform 209 can also provide the executable code for execution in the virtual machine 211. In some aspects, at a time subsequent to the storing of the serialized code in the resource cache 213, the code-caching platform 209 may receive, a second indication of the source code awaiting executing, in a different virtual machine environment. For example, after execution of the executable code as previously discussed, the client device 200 may have been restarted or rebooted. As discussed, in response to receiving the indication, the code-caching platform 209 can check the resource cache 213 within memory 205 for cached executable code corresponding to the source code or the selected secondary source code referenced in the source code. Since the secondary source code has been previously compiled and cached in the resource cache 213, cached executable code corresponding to the secondary source code can be found in the resource cache 213. Upon the cache hit in the resource cache 213, the code-caching platform 209 retrieves the cached data from the resource cache 213 within memory 205.

The cached code includes the serialized code corresponding to the references abstracted from the secondary source code during the previous compile. The code-caching platform 209 can deserialize the retrieved serialized codes, into new executable secondary source codes. Deserialization process extracts the code from a sequence of stored data, using information (e.g., relocation data) accompanying the serialized data about the initial code, types of objects referenced by the initial code, and the types of data stored in the objects. The executable code generated through deserialization has structure, characteristics and behavior, similar to the initial executable code. Therefore, execution of the executable code, and objects referenced by the executable code, by a computer performs the same tasks performed by execution of the initial code. Both the code and the objects referenced by the code are subject to serialization and deserialization. The deserialization may include restoring the set of references from each secondary source code in new executable secondary source code using the retrieved serialized code, such that the new executable secondary source code is executable in a new virtual machine environment established on the client device 200 upon restarting. The code-caching platform 209 can then provide the new executable secondary source code for execution in the new virtual machine environment on client device 200. The new executable secondary source code may be executed with other secondary source code referenced in the source code that has not been cached and is being compiled for this execution. The code-caching platform 209 may select new secondary source code for caching at different executions of a source-code. The code-caching platform 209 may also replace previously selected and cached secondary source code with other, for example, more frequently executed secondary source code, based on an execution history of secondary source code of source code.

As previously discussed, code caching by the code-caching platform 209 may be performed within a client device 101a or 101b without communication with a server 109a or 109b via network 105. For example, in an exemplary aspect, the source code that is being serialized and deserialized by the code-caching platform 209 may be code locally stored on a memory of the client device 101a or 101n.

Figure 3:
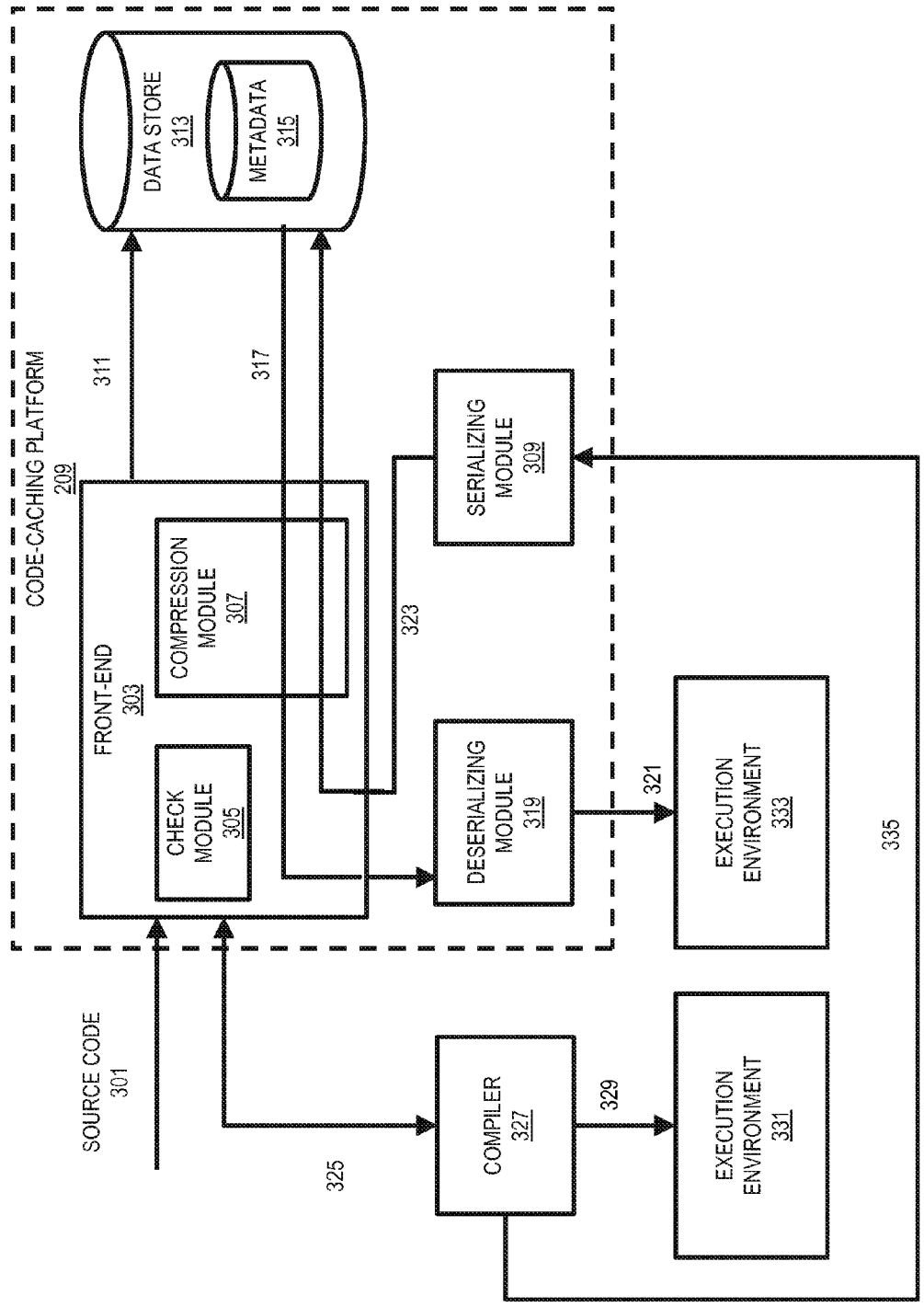
FIG. 3 is a flow diagram of a code-caching platform by which serialization of a script into cached code and deserialization of cached code into executable code may be provided.

FIG. 3 is a flow diagram of a code-caching platform by which compilation and serialization of source code and/or selected sun-codes referenced in the source code into cached code and deserialization of cached code into executable code may be provided. As shown in FIG. 3, the code-caching platform 209 may include a front-end 303, a serializing module 309 and a deserializing module 319. The front-end 303 may include a check module 305 and a compression module 307. The front-end 303 receives source code 301. Upon receiving the source code, the check module 305 checks data store 313 (shown as arrow 311) for cached serialized code corresponding to the source code. If the serialized code is not found (cache miss) in data store 313, the front-end 303 sends the source code to compiler 327 (shown as arrow 325). The compiler 327 compiles the source code and stores the executable code and references. The compiler 327 may store the executable code and references in a memory location associated with an execution environment 331 (not shown in FIG. 3). The executable code can be sent to execution environment 331 (shown as arrow 329) for execution within the execution environment 331, for example a virtual machine similar to virtual machine 211 of FIG. 2, within a browser session.

The compiler 327 can send the executable code and references to the serializing module 309 for serialization (shown as 335). The front-end 303 may select parts (e.g. secondary source codes) referenced in the source code for serialization, for example, based on a frequency of execution of the parts in past executions or based on the frequency of function calls referring to those parts within the source code. The code-caching platform 209 can select source code and/or secondary source code referenced in the source code for serialization and caching based on various criteria (e.g., heuristics). Some example criteria can be: size of the source code or secondary source codes; age of the source code or secondary source codes (e.g., based on the last revision date or an expiration date of the source code or the secondary source code); usage frequency of the source code or secondary source codes (e.g., cache the code after nth encounter); a frequency of a cached code being replaced in the resource cache 213; number of times the secondary source code is referenced in the primary source code; or a compile time of the secondary source code. The code-caching platform 209 may select a secondary source code referenced in the source code for serialization and caching based on predicting that the secondary source code is referenced in the source code. For example, the code-caching platform 209 may predict that the secondary source code is referenced in the source code when the source code is being compiled. Compile results from the source code may indicate that the secondary source code will be referenced by the source code during execution.

The code-caching platform 209 may serialize source code if the source code has a size smaller than a threshold S. The rationale is that serializing large pieces of code may take a long time and may require high volumes of memory (e.g., determined based on available disk space on the client device 101a-101n) to store the cached data.

Other example criteria can be cache access latency (e.g., cache entry size); compile time of the source code or parts of the source code (e.g., record how long the initial compile of the source code took and factor the time into decision), memory capacity of the client device 101a-101n hosting the resource cache 213; a frequency of the source code update (e.g., if the source code is updated frequently, caching the source code may not be beneficial); etc. The code-caching platform 209 may calculate a trade-off between the above factors prior to selection of code to serialize. For example, weight factors can be defined for the source code or for parts of the source code to determine a level of importance of various criteria discussed above. The trade-off calculation can be for example performed based on the weight factors defined. For example, a trade-off between the code size and the memory capacity of the client device 101a-101n may result in foregoing caching of a code with a large size that may occupy a considerable memory space on the client device 101a-101n, even though the code is called frequently.

In various instances, the front-end can make a decision about whether to serialize the executable code and references. For example, some criteria may be defined by servers 109a or 109m for types of source code or parts of the source code to be serialized and types to be compiled and executed without serialization. In addition, certain types of source code may need to be verified prior to every execution of the source code for security purposes. In such cases, the front-end 303 may flag the source code or parts of the source code as source code not to be serialized.

Another code caching criteria may include application of code caching to codes that are compiled more than a predefined number of times. For example, a first time a cache miss is detected, the source code can be compiled but not serialized or cached. The source code can be marked as "compiled once", without serialization of the code being performed. Similarly, the source code can be marked with a counter indicating a number of times the source code has been compiled until a predefined threshold C is reached, upon the $C^{th}$ cache miss, the code-caching platform 209 can serialize and cache the source code. Alternatively, instead of a generic marker, a timestamp can be set on the first cache miss and the time difference between the first and the $C^{th}$ cache miss can be used to make the serialization decision. The criteria can be translated, for example, to "If the compiled code is executed at least C times a week, then cache the compiled code". Other criteria for deciding to cache source code can be considered such as for example compilation time, produced code size, HTTP cache header data, etc.

The code-caching platform 209 may use execution data of the source code for selecting the secondary source code to be cached and used further in subsequent executions. The execution data may include, for example, other pieces of code that the executed source code references during execution, execution profile of the source code, whether the source code is executed often enough (e.g., more than a predefined number of times) to make caching worthwhile, type (e.g., user defined data structures) information observed during the execution, etc. In addition, the execution data may also be serialized, so that the data can be deserialized in an execution context. After deserialization, the execution data may be used alongside the deserialized code. For example, the execution profile may be used in the execution context to decide whether or not to spend time to optimize the executable code.

Dynamically-typed languages such as, for example, JAVASCRIPT® provide an abundance of type information for objects defined in the source code. The dynamic types enable an object of the source code to have different types during different executions of the source code. However, observing various executions of source code may provide insights as to how often the type of an object varies.

The type T of a particular object O can be determined based on the object content. However, when a source code interacts with object O, the source code does not have access to the type information and therefore the object type T is unknown to the source code. As a result, the source code needs to determine type T prior to accessing object O. In some aspects, the code caching platform 209 determines and caches the object type T. For example, the code caching platform 209 may observe, in the source code, a particular type of object at the time object O is accessed in an execution environment (e.g., in a website). The code caching platform 209 can associate the access website with type T of object accessed by the website. Alongside type T, the code caching platform 209 can also cache the "how to access" information that was determined at the access time. Subsequently, when object O is accessed by a source code at the same execution environment, expected type T and access method for accessing object O are known from the cached data. The code caching platform 209 can also check whether the expected type T is the same as the type of the object at the current access. If the types match, the cached access method can be used for accessing object O without further determination of the access method needed.

In addition, the object type T can provide information on access method for accessing object O in an execution context. Once the access method for accessing object O is determined, information about the access method can be stored in resource cache as type information and associated with the access method, during serializing. Using the stored type information, at the time of deserialization, subsequent accesses to object O can be made faster, without having to determine the access method.

The serialization by the serializing module 309 can abstract references within the executable code by replacing addresses within the executable code with abstract addresses. The serializing module 309 provides serialized code corresponding to executable code and relocation data corresponding to the abstraction of the references within the executable code to front-end 303 (shown as 323). In providing the serialized code, the serializing module 309 can find relevant parts and references corresponding to the executable code and references from the execution environment 331. The serializing module 309 can convert the parts and references into a contiguous binary representation, independent from the execution environment 331, to be included in the serialized code. The front-end 303 can store the serialized code produced by the serializing module 309 in data store 313 as cached serialized code. The serializing module 309 may encode the serialized code corresponding to the abstraction using a tag to differentiate the code from other data types within the serialized code.

In another instance, after the serialized code is stored by the front-end 303 in data store 313 and relocation data within metadata 315, the front-end 303 may receive a new request for execution of the source code within a different execution environment 333, for example a new VM within a new browser session. In this instance, the check module 305 may successfully find the cached serialized code in data store 313 (cache hit). Upon the cache hit, the front-end 303 can load the cached serialized code from data store 313 (shown as 317) and send the loaded cached serialized code to the deserializing module 319. Prior to loading the cached serialized code, the front-end 303 can determine whether the cached serialized code corresponds to the same version of the source code. If the versions do not match, the front-end 303 may decide not to deserialize the cached serialized code and send a request to compiler 327 for the source code to be compiled. The front-end 303 may also evict the outdated cached codes to free up memory space. The front-end 303 may determine the versions of the cached serialized code and the source code based on a standard version confirmation process provided by a communication protocol within network 105 such as, for example the Hypertext Transfer Protocol (HTTP).

Upon obtaining the cached serialized code from data store 313, the deserializing module 319 verifies validity of the cached serialized code and deserializes the cached serialized code into executable code and references using relocation data within the serialized code. The deserializing module 319 sends the executable code and references to the execution environment 333 for execution (shown as 321). If the serialized code corresponds to parts of the source code, the parts of the source code that have not been cached can be compiled into executable code by compiler 327 and the executable code can be combined with the deserialized executable code prior to being executed in the execution environment 333.

It is noted that the serializing module 309 and the deserializing module 319 may be activated within different execution environments 331 and 333. The serialized code is generated within execution environment 331 (where the executable code and references are generated and executed), while the executable code and references provided by the deserializing module 319 are generated in a subsequent execution environment 333.

In order to reduce the size of cached data in data store 313, the compression module 307 may compress the data, for example, by applying various compression algorithms on the serialized code prior to storing the serialized code in data store 313. The compression module 307 may also decompress the cached serialized code prior to sending the cached serialized code to the deserializing module 319.

The cached serialized code can be used as a context independent full representation of the executable code and references in a different execution environment. For example, in generating the executable code and references for execution environment 333, the deserializing module 319 can mimic behavior of the compiler 327 when generating the executable code and references for execution environment 331. Therefore, after deserialization of the cached serialized code into the executable code and references, execution of the executable code and references within an execution environment 333 can provide results equivalent of execution of the executable code and references provided by compiler 327 within the execution environment 331.

The process of deserialization by the deserializing module 319 can restore references using the relocation data within metadata 315 such that the references reflect differences between the execution environment 331 and the execution environment 333. For example, as discussed above, since the serializing and the deserializing may run in different execution environments (e.g., VM instances), memory addresses of the executable code and references corresponding to the execution environment 331 may not be valid in the execution environment 333. However, the serialization and deserialization ensure that the memory addresses in the deserialized executable code and references are valid addresses within the execution environment 333. For example, references to function addresses in the execution environment are not encoded verbatim by the serializing module 309 because those function addresses may be different between different execution environments 331 and 333.

The serializing module 309 may inspect each object within the source code and the executable code and references to determine how each object should be serialized. For example, certain unique objects (e.g. the canonical undefined-value) may be included in the executable code and references within an abstract index (e.g., root array). When such a unique object is serialized by the serializing module 309, the serializing module 309 serializes the object by a unique abstract index. Upon deserialization of the unique object by the deserializing module 319, the index is used for identifying the object.

In addition, the source code may include built-in code, which are generated pieces of executable code that perform elementary tasks. The built-in code may be shared by multiple objects within the source code and therefore should be always available within the execution environment 331 (or 333). The serializing module 309 can map each built-in code to a built-in identifier and serializes the built-in identifier as a representative of the built-in code in the serialized code. Upon deserialization, the front-end 303 can find a built-in object with the same identifier in the execution environment 333.

Similarly, the source code may include code-stub. Code-stub is similar to a built-in code, except that code-stubs can be generated on-demand and are not necessarily available on the execution environment 333. The serializing module 309 can map code-stub to code-stub key when generating the serialized code. Upon deserialization, the front-end 303 can check whether the execution environment 333 includes the code-stub. If the execution environment 333 does not include the code-stub, the code-stub corresponding to the code-stub key is generated by the deserializing module 319.

Moreover, the source code may include unique string literals. The unique string literals can be serialized verbatim, by the serializing module 309. Upon deserialization, the front-end 303 checks whether that same string literal already exists in the execution environment 333. If the unique string literal exists in the execution environment 333, the deserializing module 319 canonicalizes the string literal to the already existing unique string. Canonicalization process converts the string literal with more than one representation (e.g., one representation in the cached serialized code and a second representation in the execution environment 333) into a standard or canonical form.

In some instances, objects that are serialized have references to a source string of the source code. In such instances, the serializing module 309 can replace the object with a special representation. Upon deserializing, the deserializing module 319 can replace the special code with a reference to the source string that is provided separately at the time of deserializing within the execution environment 333.

In addition to the serialization of object addresses discussed above, addresses embedded into the executable code can be addresses of certain values in the execution environment or addresses of functions of the VM. The addresses of certain values in the execution environment and addresses of functions of the VM are known to the compiler and to the VM. These addresses can, for example, be represented by a reference identifier and the reference identifier can be used to restore the address when deserializing. Moreover, the source code may include non-unique objects. The non-unique objects can be serialized as copies. For example, the non-unique objects may consist of data fields and references to other objects. When serializing, the data fields can be copied and references to other objects, if unique, can be serialized as previously discussed with regard to unique objects.

The following example describes a code-caching process from compilation to serialization and deserialization of a sample code. The sample JAVASCRIPT® code (A) is considered in this example.

function foo ( ) {return 1;} foo ( );  (A)

The executable code for sample code (A) may include instructions such as: function header, instructions to check against on stack overflow (calling stack overflow built-in), variable declaration "foo", instantiation of closure for inner function ( ) { return 1;}, assigning closure to a global property named "foo", loading a global property named "foo", calling the loaded property, and returning undefined value.

In addition, the executable code for sample code (A) may include references to relocation information, where the relocation information may indicate that: the stack overflow built-in is a built-in, the string literal "foo" is an object on the heap, the function description for ( ) {return 1;} is an object on the heap, the function closure initialization is implemented as run-time call and as such is an external reference, loading property is a call to a stub, calling property is a call to a stub, and the undefined value can be an object on the heap, for example a unique object as previously discussed with regards to FIG. 3.

The executable code for sample code (A) may also include metadata associated with the string literal "foo" such as, for example, "foo" is an object of type "internalized string" denoted by a map object, the string content is "foo", and the length of the string is 3. The executable code for sample code (A) may also include function descriptions for the top-level function, and the inner function ( ) {return 1;}. The function descriptions may be objects of type "shared function information" denoted by a map object. The function descriptions may contain character positions for start and end points in the source code. The function descriptions may also point to the compiled code, if the sample code (A) has already been compiled.

Initially, the inner function "foo" is compiled lazily. Lazy compilations means that the inner function "foo" is not compiled when the top-level code is compiled, but only a description of the inner function "foo" is created during the compilation of the top-level code. When the inner function "foo" is eventually called (e.g., during an execution of the top-level code), the inner function "foo" is compiled on demand. However, as long as the inner function "foo" is not compiled, an executable code for it does not exist and the executable code for the inner function cannot be serialized.

There are different ways for a code-caching platform 209 to include the compiled code for the inner function "foo" in the cached data. The code-caching platform 209 may recognize that the inner function "foo" is called within the top-level code ("foo" is defined and called in sample code (A)). Having this recognition, the code-caching platform 209 can eagerly compile the inner function "foo" as part of compiling the top-level code and include the compiled code of the inner function "foo" in compilation of the top-level code and used the compiled code for serializing after compiling the top-level code.

Another way for including the compiled code for the inner function "foo" in the serialized code is for the code-caching platform 209 to execute the top-level code at least once prior to serialization. Since the inner function "foo" is called during the execution of the top-level code, "foo" can be lazily compiled, as discussed above, and the compiled code can be stored in a memory. In this case, when serializing the top-level code afterwards, the inner function description for "foo" (created during the initial compilation of the top-level code) points to the lazily compiled code of the inner function "foo". This can cause the code-caching platform 209 to serialize the inner function "foo" when serializing the top-level code.

The serializing module 309 can serialize the sample code (A) by visiting the object graph, traversing references, starting at the function description for the top-level code. The code-caching platform 209 may keep a history of the objects already visited in data store 313 such that an object is not serialized more than once or run into an infinite loop. The objects that have already been visited and serialized can be represented (encoded) as back references. An object may contain either content or references to other objects. Object contents can be serialized verbatim. However, references to other objects can be either references to known objects, or references to objects that also need to be serialized. For example, the function description may have a reference to the "shared function information" map, and to the compiled code for the function. It may also contain information on character positions, which is serialized verbatim. Map objects encountered by the serializing module 309 can be canonical objects and part of the root list. The serializing module 309 may find the map objects in the root list and use the root list index to represent the objects.

The code object for the top-level function can be serialized verbatim aside from the references to its map (for code objects) and the reference to the relocation information. The instruction stream may contain embedded pointers described by the relocation information. These pointers are also visited during serialization. Since the pointers need to be updated upon deserialization, they can be replaced by zero (0) values before serialized verbatim.

The code object of the top-level function points to the function description of the inner function "foo". If the inner function "foo" has already been compiled at this point, its function description points to the compiled code such that the serializing module 309 can traverse from the top-level function to the inner function "foo" and serialize the code objects of both top-level and inner functions. In addition, code stubs can be represented by a code stub key and built-ins can be represented by built-in IDs. String content can be serialized verbatim (aside from the string map) and external references can be mapped to external reference IDs.

The process of deserialization by the deserializing module 319 may include retracing the order in which the serialization was performed by visiting the object graph. This tracing can be used to translate serialized code representations back to the counterparts in the execution environment 333 in which the deserialized code can be executed. For example, if an undefined value has been encoded as a root list index during serialization, the deserializing module 319 can use the root list index to find the undefined value in the execution environment 333. In addition, back references can be translated back to references to objects that have already been deserialized. The deserialization result can be the function description for the top-level function.

Figure 4A:
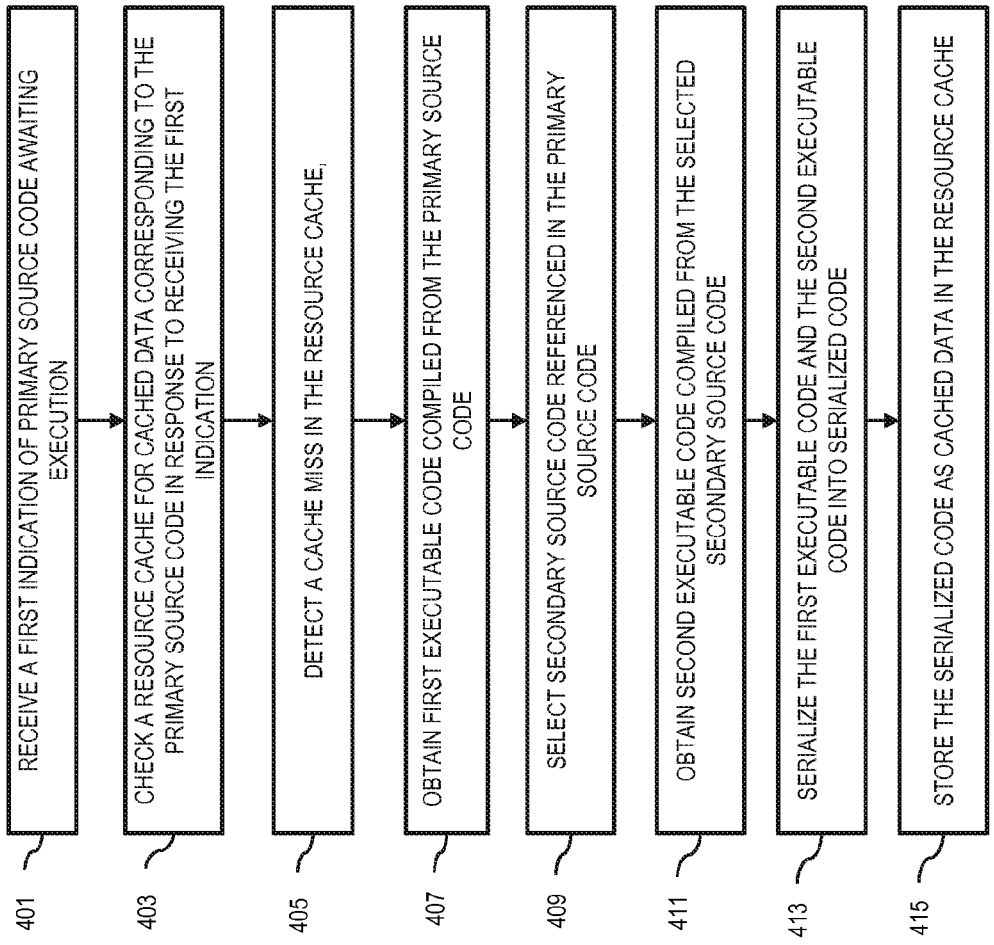
FIGS. 4A-4B illustrate examples of processes by which serialization of a script into cached code may be provided.
Figure 4B:
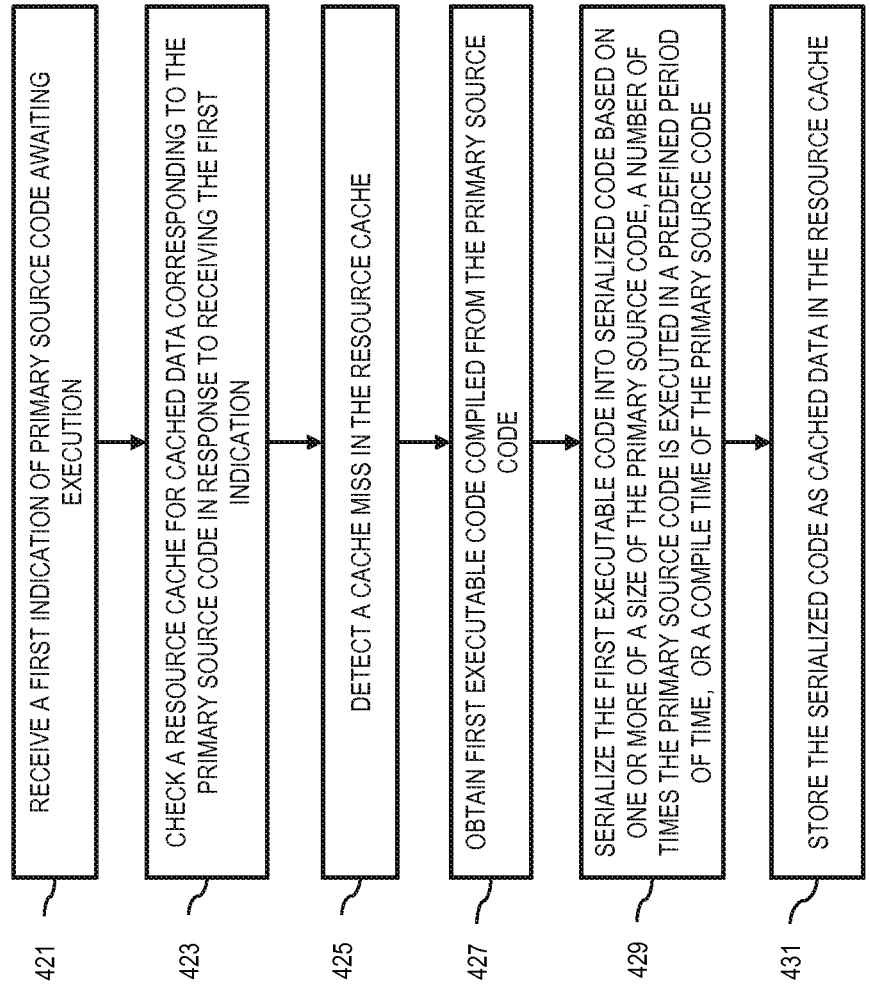

FIGS. 4A-4B illustrate examples of processes by which serialization of code into cached code may be provided. Although FIGS. 4A-4B are described with reference to FIGS. 1, 2 and 3, the subject technology is not limited to such and can apply to other client devices and systems. FIG. 4A illustrates an example of a process for serializing code into cached code. At block 401, the front-end 303 receives an indication (e.g., a link, an address, a URL, etc.) of a primary source code awaiting execution. For example, the primary source code can be a script in a web page for execution in a current browser session. A user of the client device 101*a* or 101*n* hosting the code-caching platform 103*a* or 103*n* of FIG. 1 (or code-caching platform 209 of FIG. 2) may request execution of the primary source code by entering a URL address in the current browser session. The URL address may provide a link for loading a web page, which includes the embedded primary source code.

Upon loading the web page, the browser may send the indication of the primary source code to front-end 303. In response to receiving the indication, at block 403, the check module 305 checks a resource cache in data store 313 for cached data corresponding to the primary source code. For example, the web page may have been loaded in another browser session prior to the current browser session and the code-caching platform 209 may have stored the executable code corresponding to the primary source code in data store 313. If data store 313 includes an executable code corresponding to the primary source code, the checking of block 403 may return a cache hit. However, if the check at block 403 does not find a hit, the returned result may be a cache miss (shown as block 405).

At block 407, upon a cache miss in the data store 313, the front-end 303 can obtain executable code compiled from the primary source code. For example, the front-end 303 can send the primary source code to compiler 327 for compiling.

At block 409, the front-end 303 can select parts of the source code or secondary source code referenced in the primary source code. For example, the secondary source code can be a function referenced in the primary source code. The selection of the parts of the source code can be based on various factors and criteria (heuristics) as discussed with respect to FIGS. 2 and 3. At block 411, the front-end 303 can obtain executable code compiled from the secondary source code. For example, the front-end 303 can send the secondary source code to compiler 327 for compiling. In some instances, the front-end 303 may send an entire source code including the primary source code and a set of secondary source codes referenced in the primary source code to the compiler without selecting the parts. For example, upon receiving the cache miss, the front-end 303 may send the source code, and/or selected secondary source codes referenced in the source code, to compiler 327.

Compiler 327 compiles the received primary source code or the secondary source code and sends the executable code to the serializing module 309. The compiler 327 may store the executable code in a memory of the client device 101a or 101n. The executable code includes a set of references such as addresses and identifiers corresponding to objects in the source code, or the selected parts. The set of references corresponding to the executable code may include memory addresses embedded in the executable code corresponding to the execution environment 331. The execution environments 331 (or 333) can be VMs within the web browser session in which the source code is executed. The references provide execution data for the executable code 329 to processor 201 when executing the executable code in an execution environment 331, for example a VM environment created by an execution engine (not shown) for the executable code.

Upon receiving the executable code by the compiler 327, at block 413, the serializing module 309 serializes the executable code. The serialization includes abstracting the set of references in the executable code from the execution environment 331 and defining relocation data associated with the serialized code to reflect the abstractions, as previously discussed with regard to FIGS. 2 and 3. Abstracting the set of references from the execution environment 331 by the serializing module 309 may include replacing embedded memory addresses with abstract addresses. For example, an embedded address can be converted to a function of the VM into a particular index in a predefined list of functions. In some instances, if the executable code contains an address that points into the same code, an abstract address can be generated by replacing a memory address with an offset address from a starting address of a block of memory assigned to the executable code, and the embedded address may be converted into the relative offset from the start of the code.

At block 415, the front-end 303 stores the serialized code as cached data in a resource cache in data store 313 to be provided for execution in the execution environment 331. In some instances, prior to serializing the executable code by the serializing module 309, the front-end 303 may determine availability of a processor 201 for performing the serializing. In such instances, if a processor is not available, the front-end 303 may delay the serializing until the processor becomes available.

The source code may include references to multiple secondary source codes (e.g., functions). In such cases, the executable code may include multiple executable secondary source codes such that each executable secondary source code corresponds to a secondary source code referenced in the source code. The front-end 303 can select executable secondary source code for serialization. The front-end 303 may also determine executable secondary source code to remain un-serialized within the serialized code. The front-end 303 may determine the deserializing of the secondary source code based on the references associated with the executable code, based on the relocation data, based on a type of the secondary source codes, based on a security identifier of the secondary source codes, etc. The source code may be a top-level script of an application 207. The front-end 303 may select the top-level script of application 207 for serialization as source code, for example, based on predefined conditions.

In some instances, the front-end 303 may receive an indication (e.g., a link, an address, a URL, etc.) of the primary source code awaiting execution. For example, the primary source code can be a script in a web page. In response to receiving the indication, as discussed with regard to block 403 of FIG. 4A, the check module 305 checks the resource cache in data store 313 for cached data corresponding to the primary source code and to the secondary source code selected at block 409 of FIG. 4A. Upon a cache hit in the resource cache in data store 313, the front-end 303 can retrieve the cached data including the serialized code from the resource cache in the data store 313.

The deserializing module 319 can deserialize the retrieved cached serialized code into executable code. The deserialization by the deserializing module 319 may include restoring, using the retrieved cached serialized code, the set of references in the executable code based on an execution environment 333. The front-end 303 can provide the executable code and references for execution in the execution environment 333.

It is noted that in some instances, the deserialization by the deserializing module 319 may fail, for example due to data corruption. In such instances, the front-end 303 can delete the cached serialized code from data store 313. Therefore, the next time an indication of the source code awaiting execution is received, the check by the check module 305 may return a cache miss, as shown at block 403 of FIG. 4A, and the serializing process according to FIG. 4A can be performed.

In some instances, the selection of secondary source code of block 409 may be based on execution results obtained from execution of the executable code obtained at block 407. For example, the first executable code obtained at block 407 may be executed once or multiple times prior to selection of the secondary code. In such instances, the code-caching platform 209 may obtain the execution results from execution of the first executable code in a first execution context and select the secondary source code based on the execution results. Upon execution of the first executable code, the code-caching platform 209 may collect data related to the execution to determine secondary source codes (e.g., functions) that are referenced and executed.

The code-caching platform 209 may select the executed secondary source codes for caching instead of caching the entire source code. Because according to various conditions within the primary source code, conditions related to the execution environment on client device 200, user input, etc., some secondary source codes (e.g., functions) may be executed and some may not. The code-caching platform 209 can determine secondary source codes that are executed by collecting data related to multiple executions of the primary source code on the client device 200 and determine secondary source codes that are executed more often that other secondary source codes. The code-caching platform 209 can select the secondary source code for caching based on the determination. The code-caching platform 209 may also determine function calls within the primary source code where each function call includes execution of a function. The code-caching platform 209 may collect information about execution of the function calls and select the functions that are being executed during the executing for caching.

The code-caching platform 209 may select the secondary source code based on various other factors such as, for example, size of the secondary source code, size of the secondary executable code, number of times the secondary source code is referenced in the primary source code, compile time of the secondary source code, etc. For example, FIG. 4B illustrates an example of a process for serializing code into cached code based on a set of conditions. At block 421, the front-end 303 receives an indication (e.g., a link, an address, a URL, etc.) of a primary source code awaiting execution. In response to receiving the indication, at block 423, the check module 305 checks a resource cache in data store 313 for cached data corresponding to the primary source code, as previously discussed with respect to FIG. 4A. If the check at block 423 does not find a hit, the returned result may be a cache miss (shown as block 425).

At block 427, upon a cache miss in the data store 313, the front-end 303 can obtain executable code compiled from the primary source code. For example, the front-end 303 can send the primary source code to compiler 327 for compiling.

At block 429, the serializing module 309 serializes the executable code into serialized code based on size of the primary source code, number of times or frequency the primary source code is executed in a predefined period of time, compile time of the primary source code, or a combination thereof. For example, if the primary source code is executed less than 10 times during a week, the serializing module 309 may forego serializing the primary source code. However, a primary source code that is executed more often (e.g., more than 10 times during a week) may be serialized. At block 431, the front-end 303 stores the serialized code as cached data in a resource cache in data store 313 to be provided for execution in an execution environment 331 or 333.

As set forth above, aspects of the subject technology are described in terms of caching executable code for execution in different execution environments such as instances of web browsers, where the data is serialized in one web browsing session and deserialized in another web browser session. However, the subject technology is not limited to the web browser environment. The subject technology may be applicable to caching executable code in any execution environment. In addition, the subject technology may be applicable to serializing and caching data in a first client device 101a-101n of FIG. 1 (or server 109a-109m of FIG. 1), and transferring the cached data to a second client device 101a-101n (or server 109a-109m), such that the cached data is deserialized and executed in the second client device 101a-101n (or server 109a-109m).

The above-described features and applications can be implemented as software processes that are specified as a set of instructions recorded on a computer readable storage medium (also referred to as computer readable medium). When these instructions are executed by processing unit(s) (e.g., processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. In addition, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on electronic systems, define specific machine implementations that execute and perform the operations of the software programs.

A computer program (also known as source code, program, software, software application, script, code) can be written in any form of programming language, including compiled or interpreted languages, declarative or procedural languages. In addition, the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., scripts stored in a markup language document), in a single file dedicated to the program in question, or in multiple coordinated files (e.g., files that store modules, sub programs, or portions of code). A computer program can be deployed to be executed on one computer or on multiple computers that are located at one site or distributed across multiple sites and interconnected by a communication network.

Figure 5:
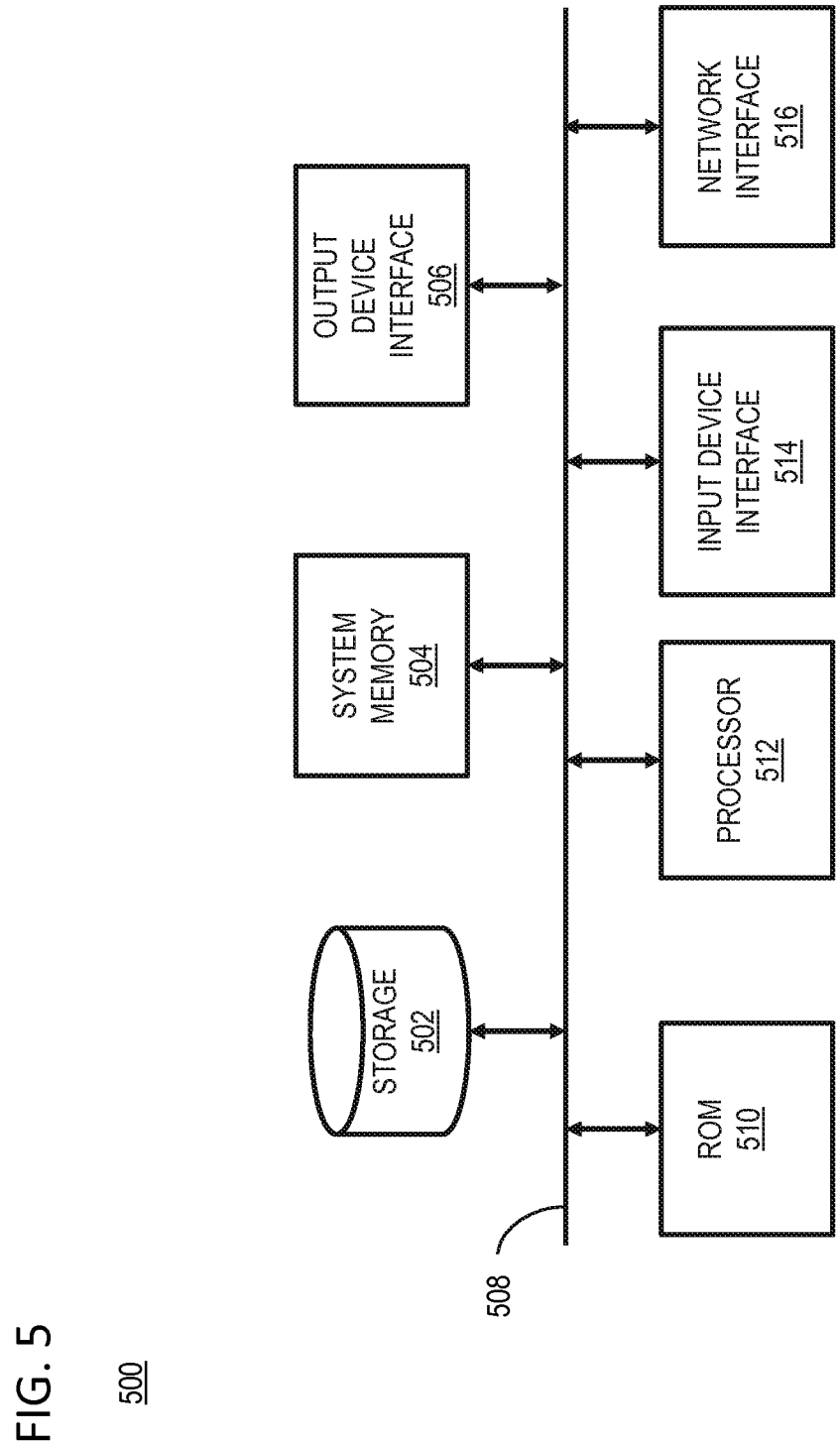
FIG. 5 conceptually illustrates an example electronic system with which some implementations of the subject technology are implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at run-time. In some implementations, the processes of the subject disclosure are stored in system memory 504, permanent storage device 502, or ROM 510. For example, the various memory units include instructions for presenting web elements in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

These functions described above can be implemented in digital electronic circuitry, in computer software, firmware or hardware. The techniques can be implemented using computer program products. Programmable processors and computers can be included in or packaged as mobile devices. The processes and logic flows can be performed by programmable processors and by programmable logic circuitry. General and special purpose client devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of such back end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A code caching system comprising:
   a memory comprising instructions; and
   one or more processors configured to execute the instructions to:
   upon a cache miss in a resource cache:
   obtain first executable code compiled from primary source code awaiting execution;
   obtain second executable code compiled from secondary source code referenced in the primary source code and selected based on one or more of a size of the secondary source code or compile time of the secondary source code;
   serialize the first executable code and the second executable code into serialized code that is configured to be reconstructed in multiple execution contexts;
   store the serialized code, an object referenced in the selected secondary source code, an access method for accessing the object referenced in the selected secondary source code, and a type of the object as cached data in the resource cache, wherein the instructions cause the one or more processors to use the access method to access the cached object when a cache hit occurs for the cached object and when the type of the object matches an object type of a data access for the cache hit;
   obtain an execution history of the selected secondary source code; and
   replace the selected secondary source code with other secondary source code that has been more frequently executed than the selected secondary source code based on the execution history of the selected secondary source code.

2. A code caching system comprising:
   one or more processors; and
   a machine-readable medium comprising instructions stored therein, which when executed by the one or more processors, cause the one or more processors to perform operations comprising:
   receiving a first indication of primary source code awaiting execution;
   checking a resource cache for cached data corresponding to the primary source code in response to receiving the first indication; and
   upon a cache miss in the resource cache:
   obtaining first executable code compiled from the primary source code;
   selecting secondary source code referenced in the primary source code based on one or more of a size of the secondary source code or compile time of the secondary source code;
   obtaining second executable code compiled from the selected secondary source code;
   serializing the first executable code and the second executable code into serialized code that is configured to be reconstructed in multiple execution contexts;
   storing the serialized code, an object referenced in the selected secondary source code, an access method for accessing the object referenced in the selected secondary source code, and a type of the object as cached data in the resource cache, wherein the instructions cause the one or more processors to use the access method to access the cached object when a cache hit occurs for the cached object and when the type of the object matches an object type of a data access for the cache hit;
   obtaining an execution history of the selected secondary source code; and
   replacing the selected secondary source code with other secondary source code that has been more frequently executed than the selected secondary source code based on the execution history of the selected secondary source code.

3. The system of claim 2, wherein the instructions further cause the one or more processors to perform operations comprising:
  obtaining execution results from execution of the first executable code in a first execution context, wherein the selected secondary source code is selected based on the execution results.

4. The system of claim 3, wherein the instructions further cause the one or more processors to perform operations comprising:
  receiving a second indication of the primary source code awaiting execution in a second execution context, wherein the second indication is received subsequent to the first indication;
  checking the resource cache for cached data corresponding to the primary source code and to the selected secondary source code, in response to receiving the second indication; and
  upon a cache hit in the resource cache:
  retrieving the cached data comprising the serialized code from the resource cache;
  deserializing the retrieved serialized code, into third executable code; and
  providing the third executable code for execution in the second execution context.

5. The system of claim 4, wherein the first execution context and the second execution context are two different virtual machine environments for code execution.

6. The system of claim 5, wherein the primary source code is a script in a web page and the first execution context and the second execution context are web browser sessions within which the script is executed.

7. The system of claim 2, wherein the selected secondary source code is selected further based on one or more of a size of the second executable code, a prediction that the selected secondary source code is referenced in the primary source code, a number of times the selected secondary source code is referenced in the primary source code, or a frequency of the selected secondary source code referenced in the primary source code.

8. The system of claim 2, wherein the primary source code is a top-level script of a web page.

9. The system of claim 2, wherein the first executable code comprises a set of references including memory addresses embedded in the first executable code, and wherein serializing the first executable code includes replacing the embedded memory addresses with abstract addresses.

10. A code caching system comprising:
  one or more processors; and
  a machine-readable medium comprising instructions stored therein, which when executed by the one or more processors, cause the one or more processors to perform operations comprising:
  receiving a first indication of primary source code awaiting execution;
  checking a resource cache for cached data corresponding to the primary source code in response to receiving the first indication; and
  upon a cache miss in the resource cache:
  obtaining first executable code compiled from the primary source code;
  selecting secondary source code referenced in the primary source code based on one or more of a size of the secondary source code or compile time of the secondary source code;
  obtaining, second executable code compiled from the selected secondary source code;
  serializing the first executable code and the second executable code into serialized code that is configured to be reconstructed in multiple execution contexts based on one or more of a size of the primary source code, a number of times or a frequency of the primary source code being executed in a predefined period of time, or a compile time of the primary source code;
  storing the serialized code, an object referenced in the selected secondary source code, an access method for accessing the object referenced in the selected secondary source code, and a type of the object as cached data in the resource cache, wherein the instructions cause the one or more processors to use the access method to access the cached object when a cache hit occurs for the cached object and when the type of the object matches an object type of a data access for the cache hit;
  obtaining an execution history of the selected secondary source code; and
  replacing the selected secondary source code with other secondary source code that has been more frequently executed than the selected secondary source code based on the execution history of the selected secondary source code.

11. The system of claim 10, wherein the selected secondary source code is selected further based on one or more of a size of the second executable code, a prediction that the selected secondary source code is referenced in the primary source code, a number of times the selected secondary source code is referenced in the primary source code, or a frequency of the selected secondary source code referenced in the primary source code.

12. The system of claim 10, wherein the instructions further cause the one or more processors to perform operations comprising:
  obtaining execution results from execution of the first executable code in a first execution context, wherein the selected secondary source code is selected based on the execution results.

13. The system of claim 12, wherein the instructions further cause the one or more processors to perform operations comprising:
  receiving a second indication of the primary source code awaiting execution in a second execution context, wherein the second indication is received subsequent to the first indication;
  checking the resource cache for cached data corresponding to the primary source code and to the selected secondary source code, in response to receiving the second indication; and
  upon a cache hit in the resource cache:
  retrieving the cached data comprising the serialized code from the resource cache;
  deserializing the retrieved serialized code, into third executable code; and
  providing the third executable code for execution in the second execution context.

14. The system of claim 13, wherein the first execution context and the second execution context are two different virtual machine environments for code execution.

15. The system of claim 10, wherein the first executable code comprises a set of references including memory addresses embedded in the first executable code, and wherein serializing the first executable code includes replacing the embedded memory addresses with abstract addresses.

16. A computer-readable medium comprising instructions that, when executed by a computer, cause the computer to:
receive a first indication of primary source code awaiting execution;
check a resource cache for cached data corresponding to the primary source code in response to receiving the first indication; and
upon a cache miss in the resource cache:
obtain first executable code compiled from the primary source code;
obtain execution results from execution of the first executable code in a first execution context;
select secondary source code referenced in the primary source code based on the execution results and further based on one or more of a size of the secondary source code or compile time of the secondary source code;
obtain second executable code compiled from the selected secondary source code;
serialize the first executable code and the second executable code into serialized code that is configured to be reconstructed in multiple execution contexts;
store the serialized code, an object referenced in the selected secondary source code, an access method for accessing the object referenced in the selected secondary source code, and a type of the object as cached data in the resource cache, wherein the instructions cause the computer to use the access method to access the cached object when a cache hit occurs for the cached object and when the type of the object matches an object type of a data access for the cache hit;
obtain an execution history of the selected secondary source code; and
replace the selected secondary source code with other secondary source code that has been more frequently executed than the selected secondary source code based on the execution history of the selected secondary source code.

17. The computer-readable medium of claim 16, wherein the first executable code comprises a set of references including memory addresses embedded in the first executable code, and wherein serializing the first executable code includes replacing the embedded memory addresses with abstract addresses.

18. The computer-readable medium of claim 16, wherein the execution results indicate a number of times the selected secondary source code referenced in the primary source code is executed at the execution of the primary source code.

19. The computer-readable medium of claim 16, wherein the instructions further cause the computer to:
receive a second indication of the primary source code awaiting execution in a second execution context, wherein the second indication is received subsequent to the first indication;
check the resource cache for cached data corresponding to the primary source code and to the selected secondary source code, in response to receiving the second indication; and
upon a cache hit in the resource cache:
retrieve the cached data comprising the serialized code from the resource cache;
deserialize the retrieved serialized code, into third executable code; and
provide the third executable code for execution in the second execution context.

20. The computer-readable medium of claim 19, wherein the first execution context and the second execution context are two different virtual machine environments for code execution.

21. The computer-readable medium of claim 19, wherein the instructions further cause the computer to:
obtain a first execution profile associated with the first executable code and a second execution profile associated with the second executable code;
serialize the first execution profile and the second execution profile; and
store the serialized first execution profile and second execution profile in the resource cache, wherein deserializing the retrieved serialized code includes deserializing the first execution profile and the second execution profile.

22. The computer-readable medium of claim 16, wherein the instructions further cause the computer to:
determine availability of a processor to perform the serializing the first executable code and the second executable code into the serialized code; and
delay the serializing when the determining indicates unavailability of the processor.

* * * * *